United States Patent [19]

Wilson et al.

[11] Patent Number: 5,692,793
[45] Date of Patent: Dec. 2, 1997

[54] AUTOMATED TARPING DEVICES

[76] Inventors: Hayes Wilson, 945 W. Rialto, Clovis, Calif. 93612; Jesse Holt, 573 E. Mariners Cir., Fresno, Calif. 93720

[21] Appl. No.: 390,026

[22] Filed: Feb. 17, 1995

[51] Int. Cl.⁶ ..................................................... B60J 5/06
[52] U.S. Cl. .......................................... 296/100; 296/155
[58] Field of Search ........................................ 296/100, 155

[56] References Cited

U.S. PATENT DOCUMENTS

| | | |
|---|---|---|
| 3,447,830 | 6/1969 | Willison ........................ 296/100 X |
| 4,037,870 | 7/1977 | O'Neal . |
| 4,700,985 | 10/1987 | Whitehead . |
| 4,991,901 | 2/1991 | Meekhof, St. et al. . |
| 5,002,328 | 3/1991 | Michel . |
| 5,498,057 | 3/1996 | Reina et al. ........................ 296/100 |

FOREIGN PATENT DOCUMENTS

| | | | |
|---|---|---|---|
| 157429 | 7/1986 | Japan ........................ | 296/100 |
| 404143122 | 5/1992 | Japan ........................ | 296/100 |

*Primary Examiner*—Joseph D. Pape
*Attorney, Agent, or Firm*—Dennis B. Haase

[57] ABSTRACT

The present invention relates to apparatus of the automatic covering and uncovering of a defined space within which a load of goods is disposed. The space may be the bed of a tractor-trailer, or stationary, and the apparatus includes a framework disposed about and over the space to be covered; a flexible cover disposed about the framework, a cabling system, including cables which movably secures the cover to the framework, and a motor secured to the cabling system for moving the cables to move the cover to uncover and cover the load of goods.

20 Claims, 3 Drawing Sheets

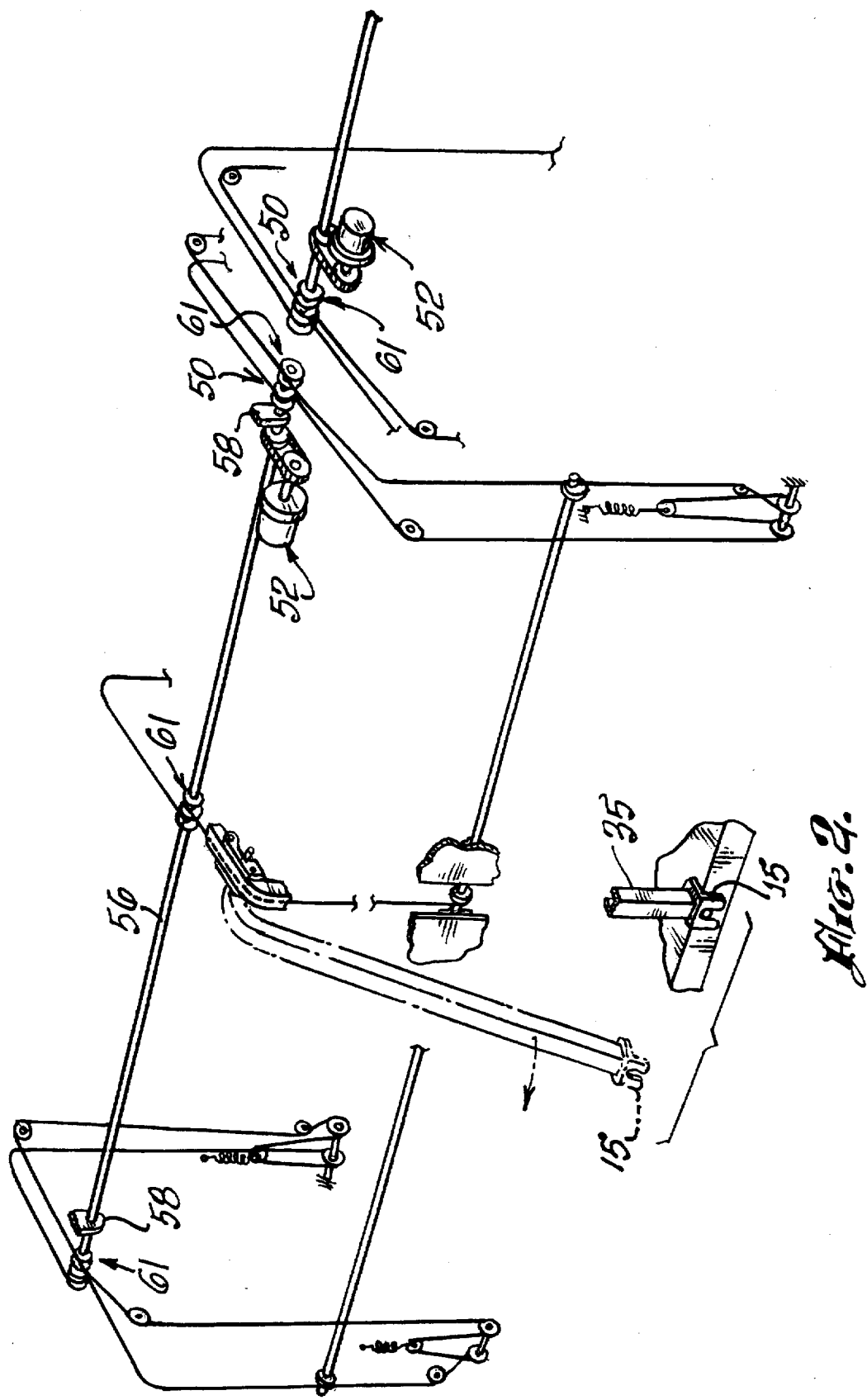

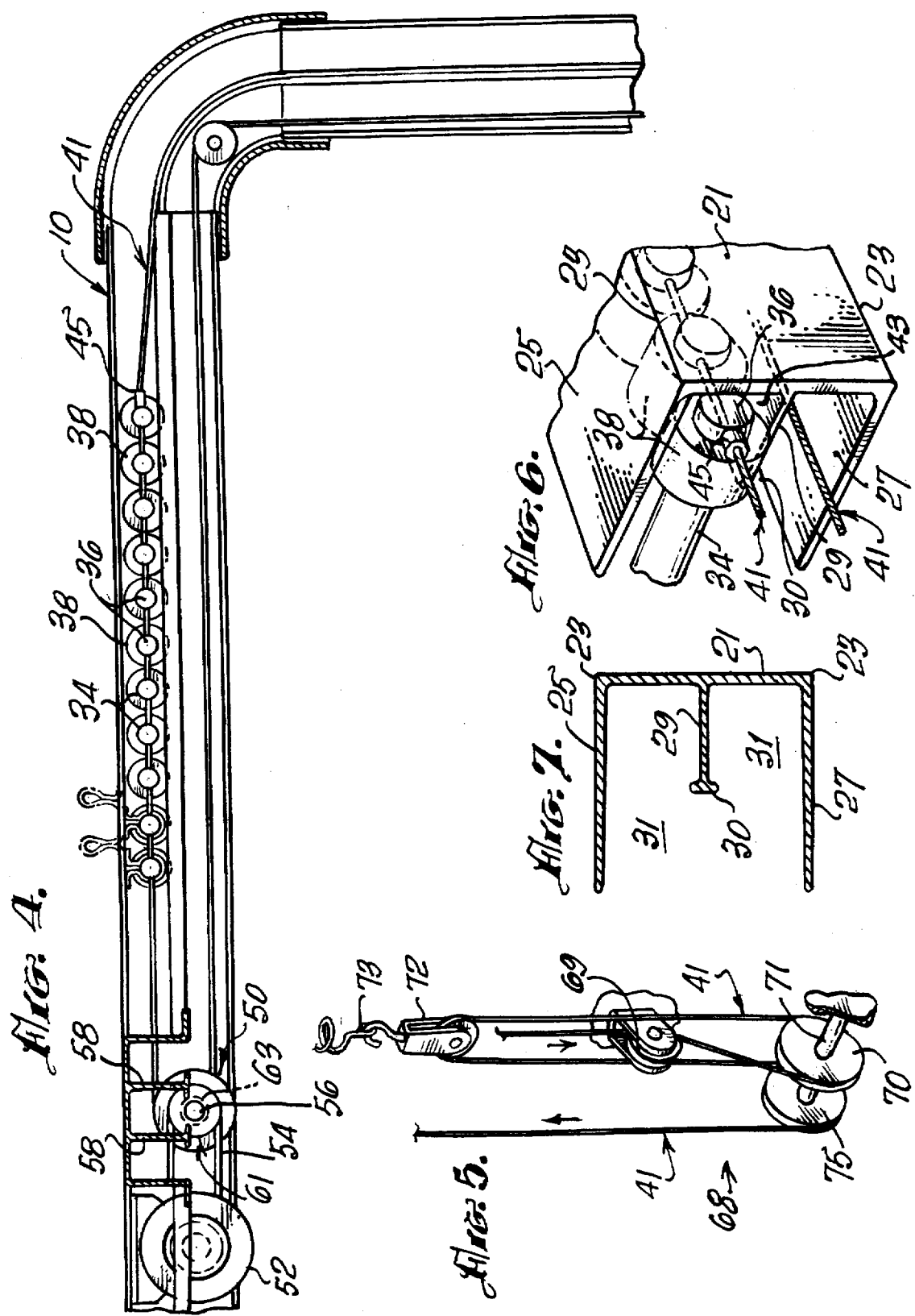

AUTOMATED TARPING DEVICES

The present invention is concerned, in a very general sense, with the covering and uncovering of goods disposed in groupings, or on pallets, with relatively soft materials, such as tarpaulins and is more specifically directed to improvements in automated devices for moving the tarpaulin, more colloquially referred to as a tarp, between a covering and uncovering position. The invention has particular, although not exclusive, use in connection with vans and trailers which are side rather than top loaded.

BACKGROUND OF THE INVENTION

1. Field of the Invention

The use of tarpaulins, or tarps, has become both a popular and practical means of covering a load, both during warehousing and during transportation. The term load, as used herein, may mean a myriad of products, including particulate matter, both packaged and unpackaged. The term may be as broadly construed as the imagination will permit. The thread which is common to the application of the present invention is that, whether during transportation, or simply storage, it is desirable that the product, or products, be protected from the elements, and/or from prying eyes and curious minds.

Tarping systems in current and common use are, for the most part, manual. Such systems are most common in the trucking industry where they are used to cover a load during transportation.

In such systems, the person entrusted with the task of positioning and removing the tarp typically does so by simply tossing the tarp over the load and tying it to the truck, or trailer bed, with webbing or strapping of various and sundry descriptions. Since even a smallish tarpaulin may weigh upwards of 150 pounds, the task is formidable, and not entirely free of peril.

Moreover, the amount of effort required to adequately position a tarp over a load so as to protect it from the elements and from inadvertently being dislodged from the vehicle upon which it reposes, is formidable, often requiring more than one person. Thus, while the cost of the tarp itself, and indeed the winching system required to hold it down, is usually fairly reasonable, the cost, in labor and time to tie it down, and remove it as needed, may make the system as a whole, not inexpensive.

The problem faced by a cross country hauler is exacerbated by regulations promulgated in some states that require the covering of some loads during transportation. Such regulations leave the shipper with few, if any, options and, accordingly, anything that can make the process of covering and uncovering a load both safe and economical, is a veritable boon to the industry.

2. Overview of the Prior Art

The prior art in this field has evolved from the most rudimentary manual application, to the sort of mechanization of which the present invention is representative. Gone are the days when the trucker could afford to simply throw a tarp over the load and drive off. Such cavalier efforts invite theft, loss during transit, with consequent liability to following traffic, and potential injury to the worker who attempts to handle a heavy tarp with little or no assistance beyond one's own muscle and skill.

Representative of the early evolution in the field of automated tarping is Whitehead U.S. Pat. No. 4,700,985, wherein a strap and winch system is taught for a side loading van. The Whitehead concept is somewhat reminiscent of the old window shade, wherein the tarp wraps around a torque tube. It varies to the extent that straps are affixed to the side of the tarp in order that it can be tied down in its closed position. The disclosure suggests the use of motors, but only in the most general and nondescript manner.

Unlike Whitehead, the present invention provides a true automated system that permits both side and top loading, and does not require the tying down of individual strapping, all with a minimum of human effort.

Yet another variation on the "window shade" concept is found in Meekhof, Jr. et al. U.S. Pat. No. 4,991,901, wherein a roller is power driven to move a flexible cover between an open and closed positon over the top of a truck. This device is in obvious response to the regulations in various states which require the covering of bulk products for transportation and has little to do with the problems solved by the present invention. Meekhof does disclose a cable tensioning device, but such disclosure is inadequate as a teaching of the present invention.

Michel U.S. Pat. No. 5,002,2528 is similar in nature and scope to that of Meekhof, Jr., except that a pivot arm sweeps a roll tube across the top of a hopper-type container with a movement akin to a windshield wiper, to cover and uncover the open top thereof.

Finally, O'Neal U.S. Pat. No. 4,0257,870, illustrates a trailer rig for carrying plate glass, and is germane only to the extent that it depicts a roll down type covering which covers the glass in transit.

In summary, while the foregoing description of various prior art devices is illustrative of the evolution of the art in the field of the present invention, the present invention stands as a significant and unique advance over that which has preceded it, as will become apparent as the remainder of this specification is reviewed.

SUMMARY OF THE INVENTION

The present invention is among the first systems to provide the transportation and storage industries with a fully automated system of product protection that is both versatile and efficient in both use and cost effectiveness, the latter attribute being of increasing importance in a highly competitive market.

With the foregoing in mind, it is the overall objective of the present invention to provide an automated tarping system for the protection of products, both in storage and in transit, that is operable by one person without undue strain, to fully cover and uncover such products. Ancillary to the foregoing, it is an objective of the invention to provide such a system that is compatible with a receptacle that may be both top and side loaded.

Another objective of the present invention is to provide an automated tarping system in which the tarpaulin itself is fully controlled by the system in such a manner that manual tie downs, or other means of securing the tarp in its covered position, is completely obviated.

A further objective of the present invention is to provide an automated tarping system wherein all segments of the tarp, or other flexible cover, are fully controlled at all times during covering, uncovering and storage, thereby minimizing damage to the tarp itself and the cabling of the system, from such hazards of the industry as tearing, tangles, crimping, bunching up, or incidental damage to any product intended to be protected by the system.

It is yet another objective of the present invention to provide an automated tarping system that works within a defined framework, repeatedly and with minimal maintenance, notwithstanding repeated incursion by environmental hazards such as dust, wind, heat, vibration and the like.

Other, and still further objectives of the present invention will become evident as a detailed description of a preferred embodiment is read in conjunction with the accompanying drawings, wherein:

DESCRIPTION OF THE DRAWINGS

FIG. 2 is a perspective illustrating a portion of the cabling system of the present invention for use on a van that is capable of being loaded from both sides as well as from the top;

FIG. 4 is a partial sectional view taken along lines 4—4 of FIG. 1 of the framework which forms a part of the structure of the present invention and illustrates a portion of the tarpaulin in its retracted position, and further showing a portion of the channeling which controls the tarpaulin during all stages of operation;

FIG. 5 is a breakaway view of the tensioning mechanism of the present invention, illustrating certain details thereof;

FIG. 6, is a view of the channeling and cabling system, illustrating the interrelationship thereof; and FIG. 7, illustrates a portion of the framework of the present invention, emphasizing certain details of the channeling.

DETAILED DESCRIPTION OF A PREFERRED EMBODIMENT

Figure 1:
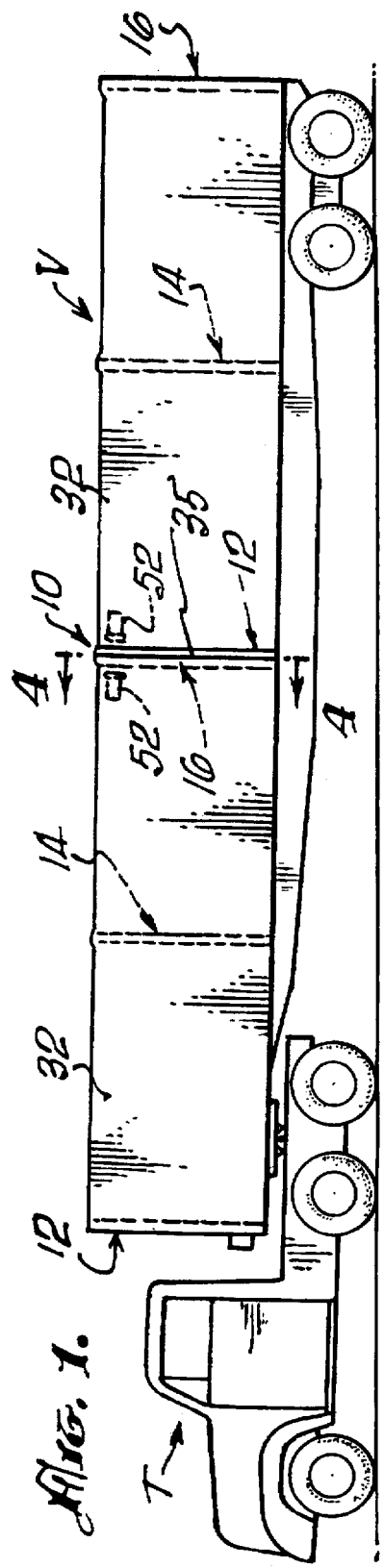
FIG. 1 is a pictorial view of a tractor trailer rig upon which the tarping system of the present invention has been installed, and specifically illustrating a forty-five foot van upon which a dual system has been installed as a means of amplifying the versatility of the system of the present invention.

With reference initially to FIG. 1, the environment within which the present invention has particular, although not exclusive, utility is illustrated in the form of a tractor T, engaged, by a fifth wheel, or similar engaging system, to a van V. The same system would be effective also in a static situation in which a load is situated on a fixed base, which is essentially the same context as the bed of a van.

It will be appreciated that the van V is but one of a variety of possible vehicles which could benefit from the present invention. Further, in order to demonstrate the value of the present invention, the van V is shown as a forty-five foot van in which a dual tarping system has been established as means of depicting the versatility of the system under most difficult circumstances.

The tarping system of the present invention includes a frame, or framework, 10, perhaps best visualized in FIGS. 1 and 2, including a plurality of at least two "U" shaped ribs which define the frame as encompassing the load disposed on its base, rather fixed, or part of the bed of a van.

In order to make optimal use of hardware and minimize expense, the illustrated case includes three such ribs, including a forward rib 12, an intermediate rib 14, and an end or trailing, rib 16.

Unquestionably the precise number of ribs used in any setup will depend on the dimension of the specific project, and the width of tarp that may be effectively used in a particular application. As will become evident, the more ribs used, the more hardware required, with a commensurate increase in expense. Thus, flexibility of the present invention permits the use of a frame 10 having an appropriate number of ribs for a given application. To this end, the intermediate rib 14 is removably attached, as at foot 15, to the van bed, in any one of several well known means, in order that it may be selectively positioned, or entirely removed to accommodate any particular need.

In any event, each rib is affixed to the base upon which the load is situate, such as the bed of the van V, in any number of well know means, and in axially spaced relation, typically equi-distant from one another. The ribs form a structural framework, upon and about which a cover of a pliable material, referred to throughout this specification simply as a tarp, is draped and upon which the working mechanism of the tarp operating system functions in accordance with the objectives of the present invention.

While each of the ribs 12, 14 and 16 provide structural integrity, it will be observed, particularly in FIGS. 2, 4, 6 and 7, that each of the ribs is so constructed as to provide a channel through which cabling may be threaded as, will be hereinafter described in greater detail.

With reference specifically to FIG. 7, the configuration of each rib may be seen in cross section. Thus, a rigid side wall 21 serves as the backbone of each rib. Extending outwardly from the termini 23 of the side wall 21 are opposed parallel end plates 25 and 27, respectively, which, together with the side wall, define a "U" shaped channel, thereby adding significantly to the structural strength of the rib, and limits torque, or twisting, of the rib itself.

In order to create a pair of parallel channels in each rib, a tongue 29 extends inwardly from the side wall 21. The tongue 29 is depicted as being equi-distant from the end plates 25 and 27 to define two essentially parallel channels of equal depth and width. It will be appreciated, however, that a departure from the symmetry illustrated may be used without departure from the invention.

One of the features of the present invention that makes it commercially attractive, is its capacity to cover and uncover a load to permit access from either or both sides of the protected area with an absolute minimum of manual labor and to do so without having to tie, or winch, down the tarpaulin every two or three feet to prevent it from flapping in the breeze and exposing the load, which it purports to protect, to the elements in accomplishing this important aspect of the invention, a flexible cover, or tarpaulin, 32 is provided and dimensioned to fit the framework 10. In order to automate the process of covering and uncovering a load, a power driven cabling system is provided which engages the tarp to alternately lift and lower the tarp at the command of the user.

In order first, to maintain control of the tarp, and, secondly, to interlace the tarp and the cabling system, the tarp 32 is fitted, along its length, with a series of transverse parallel control members 34, which, as illustrated in FIG. 2 take the form of steel rods, although other implements or devices may serve the same purpose. The control members add stiffness and stability to the cover, which is pliable, and susceptible to being blown about by wind, or lifted away from the load by hand, neither of which is normally desirable.

The carrier members are sewn, or otherwise attached to the tarp 32, in serial space relation. It has been found that in most commercial applications a twelve inch spacing between control members is entirely adequate.

Each carrier member 34 has terminal ends 36, which extend beyond the longitudinal edges of the tarp 32, and each such end is fitted, in any well known manner, with a guide wheel 38. All of the guide wheels 38 are dimensioned to effect a rolling fit within one of the channels formed between one of the end plates 25 and 27, and the tongue 29. The tongue 29, as best seen in FIG. 7, is "T" shaped, having a cross member 30 at its outer terminus. The cross member provides a lip against which the guide wheels interact to inhibit inadvertent release from the channel in which each such wheel is riding.

The carrier members 34 extend the entire width of the tarp 32 and in order to control the positon and movement of the carrier members they are, in accordance with the invention, tied together by means of a portion of a cable 41. In order to accomplish thee uniform interaction of the carrier members, the ends 36 are formed with a diametrical opening 43, which may be drilled or otherwise created in any well known manner. The opening, or passage, 43 is aligned with the longitudinal axis of the channel in which the guide wheels travel, and the cable 41 is threaded through the passage. In order to fix the position of each carrier member relative to the cable 41, a locking device 45 is connected, such as by crimping, or other suitable means, to the cable 41. The locking device is of a diameter greater than that of the passage, thereby precluding movement of the control member beyond the locking device on the cable.

Figure 3:
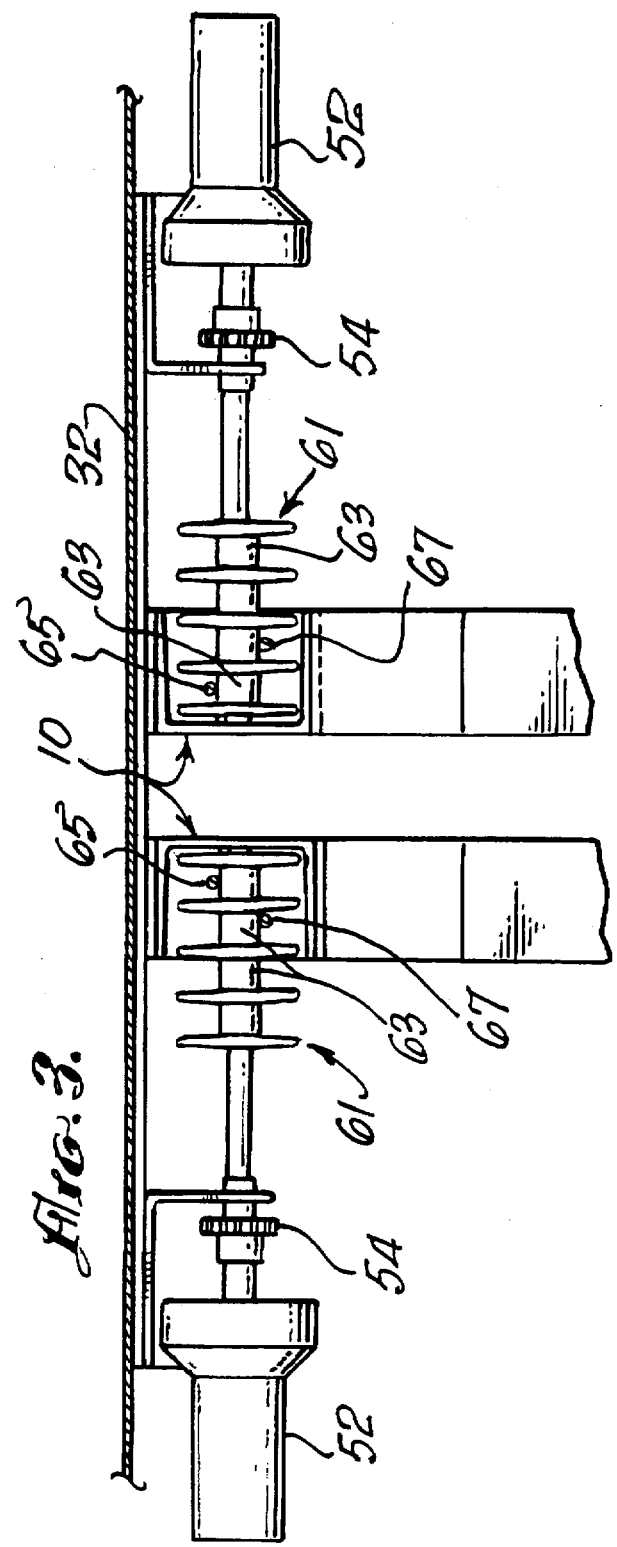
FIG. 3 is a partial top plan view of a portion of the mechanism which lends to the uniqueness and versatility of the system of the present invention.

Having thus effected complete control of the tarp 32 by means of the carrier members, raising and lowering of the tarp on the framework 10 may be automated in accordance with that aspect of the invention, by means of a spooling system 50, illustrated in considerable detail in FIGS. 2 and 3, and is positioned at the apex of the framework 10 of the system.

The spooling system 50, of the present invention, is the operative heart of the system in that it accomplishes the raising and lowering of the tarp 32 virtually with the flip of a switch. Accordingly, a reversible electric motor 52 is provided and is secured to one of the ribs of the framework in any well known manner. An electric motor is employed, as a matter of convenience rather than necessity, in that electrical power and, in particular, DC electrical power, is typically readily available on vehicles, making the use of a DC reversible motor a practical option.

The drive motor 52 is connected, by any suitable means such as a serrated belt or chain drive 54, to an elongated drive shaft 56. The drive shaft 56 extends longitudinally for the entire length of each framework 10, and for maximum efficiency, is centrally disposed on the ribs, to which the drive shaft is rotatably secured, in bearing relation, in pillow blocks 58.

In order to obtain and maintain uniformity in the extension and retraction of the tarp 32, a series of spools 61 are provided. Each spool comprises a series of cable receiving reels defined by spindles 63 separated by rings 65, adjacent ones of which together define side walls for the intermediate spindle, and the total of which defines a reel upon which cable may be wound and unwound.

It will be understood that each spool contains four reels in order to accommodate the lowering and raising of the tarp on both sides of the framework 10. For sake of brevity, the mechanism has been described with respect to one side, although the invention contemplates operation of both sides simultaneously, since the left and right sides of the framework and cover are mirror images of one another.

In accordance with the invention, there is a reel located in alignment with each channel formed in each rib, and each spool, in this preferred embodiment has four reels in order that both sides of the framework may be opened and closed simultaneously.

The cabling system of the present invention is unique in many ways, not the least of which is the fact that each section of tarp, a section being defined as that amount of tarp required to extend between, and in close proximity to adjacent rib sections, is controlled and operated by a single cable, a portion of which engages the tarp along each of its longitudinal edges 35.

In order to accomplish this arrangement, each such cable 41 is fed through one of the adjacent channels 31, formed in a proximate rib of the framework 10.

Referring to FIGS. 4 and 6, one such cable 41 is shown as it would be positioned with the tarp retracted to its uncovered position. In order to achieve the position illustrated, the motor 52 is actuated, causing the drive shaft to rotate the spool counterclockwise as seen in FIG. 4. In keeping with this aspect of the invention, one end, which may be referred to as the leading end of the cable 41, is affixed to a spindle of an aligned reel, at 65, while the trailing end of the cable is affixed to the spindle at 67. Accordingly, the leading end of the cable will begin to coil onto the spindle in a counterclockwise motion as the motor is actuated, whereas the trailing edge of the cable, together with an amount of cable which accumulated on the reel at 67 in a clockwise direction will, simultaneously with the coiling of cable about the spindle 65, begin to uncoil. The result is to raise the tarpaulin, while maintaining relatively uniform tension on the entire cable, until it is fully retracted as seen in FIG. 4. By virtue of the placement of the locking device, the control members are pulled into adjacent positions relative to one another, and the tarp will loop, or pleat, as seen in FIG. 4.

It has been found that when the tarp is of relatively heavy material, such as, for example, 27 ounce material, it will tend to loop, or pleat, upwardly as shown. When lighter materials are used, however, the tendency is to loop downwardly. Either way, however, the entire tarp is under control and is moved uniformly from its open to closed positon without the slightest damage to the material.

By virtue of the material loads carried by the cabling 41 and its overall length, however, it is virtually impossible to prevent some stretching and consequent looseness in the cable itself. Since slack in the cable will inevitably cause problems within the system as it operates, the invention contemplates the use of tensioning devices on cables disposed in permanently mounted ribs 12 and 16. To this end, and with reference to FIG. 5, such a cable tensioning device is illustrated at 68. In order to apply constant tension on the cable 41, a portion of the cable coming from a spool 61 is threaded through a pulley 69, which is permanently affixed in any well know manner to the frame of the van. The cable is then looped about a guide wheel 70, rotatably mounted to a fixed shaft 71, and through a pulley 72, which is in constant tension by means of spring 73, having one end permanently secured to the van, and the other to the pulley, as at 74. Once through the spring loaded pulley 72, the cable passes over guide wheel 75, and is returned to the spool 61.

In the manner thus described, a constant predetermined tension is maintained on the cable 41 at all relevant times.

In order to provide maximum safety and security to the system, whether or not in operation, it is contemplated that the motors 52 be equipped with sensors not specifically illustrated, but which may be of any well known construction, and which sensors are capable of sensing tension on the cable to such an extent that when the cable reaches a predetermined level, such as its fully retracted position, the motor shuts down automatically.

As a security device, the same sensor mechanism will determine when the tarp has reached its fully closed position and automatically lock down so that the tarp can not be lifted unless the motor is reactivated by an authorized person, and the load covered by the system is, thus, fully secured.

Having thus described a preferred embodiment of the present invention, what is claimed is:

1. Apparatus for raising and lowering a pliable protective cover disposed about a load positioned in a specific space on a base, comprising in combination:

a framework encompassing the space occupied by the load, said framework comprising a plurality of spaced apart ribs, said ribs being of a generally U shaped configuration, and being fixed to the base upon which the load is situated;

a cover, said cover being of a pliable material, and having a predetermined width, and being draped about and over said framework, on either side thereof, said cover having opposed longitudinal edges thereof, each of said edges being adjacent to, and in close proximity to one of said ribs of said framework;

a cable, said cable having opposed ends, a portion thereof intermediate said ends being attached to said cover along at least one of said longitudinal edges; and power means attached to another portion of said cable for pulling on said cable to raise said cover, and releasing the pulling force to lower said cover.

2. The invention as set forth in claim 1, wherein said power means comprises a reversible electric motor;

a drive shaft connected to said electric motor;

at least one spool on said drive shaft, a portion of said cable being connected to said spool such that rotation of said drive shaft causes said cable to be wound onto said spool to raise said cover.

3. The invention as set forth in claim 2, wherein both ends of said cable are attached to said spool such that rotation of said spool will cause one said end to wind onto said spool, simultaneously as the other said end unwinds from said spool.

4. The invention as set forth in claim 1, wherein a cable is attached along both longitudinal edges of said cover.

5. The invention as set forth in claim 1, wherein means is provided for continuously maintaining tension of said cable.

6. The invention as set forth in claim 1, wherein said power means includes automatic shut off means.

7. The invention as set forth in claim 1, wherein said power means includes means for locking said cover in its lowered position when said power means is turned off.

8. Apparatus for raising and lowering a pliable protective cover disposed about a load positioned in a specific defined space on a base, comprising in combination:

a framework encompassing the space occupied by the load, said framework comprising a plurality of spaced apart ribs, said ribs being of a generally U shaped configuration, and being fixed to the base upon which the load is situated;

each said rib having a pair of parallel channels disposed therein, said channels running the length of said rib;

a cover, said cover being of a pliable material, and having a predetermined width, and being draped about and over said framework, said cover having opposed longitudinal edges, each of said edges being adjacent to, and in close proximity to one of said ribs of said framework;

a plurality of control members attached to said cover in serial spaced relation; said control members, each of said members having a guide wheel, said guide wheel riding within one of said channels;

a cable, said cable having opposed ends, a portion thereof intermediate said ends being attached to said control member within one of said channels defined by said adjacent ribs; and power means attached to another portion of said cable for pulling on said cable to raise said cover, and releasing the pulling force to lower said cover.

9. The invention as set forth in claim 8, wherein said power means comprises a reversible electric motor;

a drive shaft connected to said electric motor;

at least one spool on said drive shaft, said spool having at least two reels thereon, a portion of said cable being connected to one of said reels such that rotation of said drive shaft causes said cable to be wound onto said reel to raise said cover.

10. The invention as set forth in claim 9, wherein both ends of said cable are attached to said spool such that rotation of said spool will cause one said end to wind onto one of said reels simultaneously as the other said end unwinds from another said reel.

11. The invention as set forth in claim 8, wherein a cable is attached along both longitudinal edges of said cover.

12. The invention as set forth in claim 8, wherein means is provided for continuously maintaining tension of said cable.

13. The invention as set forth in claim 8, wherein said power means includes automatic shut off means.

14. The invention as set forth in claim 8, wherein said power means includes means for locking said cover in its lowered position when said power means is turned off.

15. The invention as set forth in claim 1, wherein said framework includes a rib at each end thereof, and at least one intermediate rib, said intermediate rib being movable for loading purposes.

16. The invention as set forth in claim 1, wherein said cover on both sides of said framework are raised and lowered simultaneously.

17. The invention as set forth in claim 8, wherein said framework includes a rib at each end thereof, and at least one intermediate rib, said intermediate rib being movable for loading purposes.

18. The invention as set forth in claim 8, wherein said cover on both sides of said framework are raised and lowered simultaneously.

19. The invention as set forth in claim 8, wherein said control means comprises an elongated rod.

20. The invention as set forth in claim 8, wherein said control is provided with guide wheels at the ends thereof; said guide wheels being rotatably and movably engaged in one of said channels.

* * * * *